Sept. 8, 1970 A. W. BARBER 3,528,024
COMPLEMENTARY TRACKING OUTPUTS FROM SINGLE-ENDED AMPLIFIERS
HAVING A COMMON LEAD WITH A SINGLE-ENDED INPUT
Filed June 10, 1968 2 Sheets-Sheet 1

INVENTOR.
ALFRED W BARBER
BY Alfred W. Barber
ATTORNEY

Sept. 8, 1970 A. W. BARBER 3,528,024

COMPLEMENTARY TRACKING OUTPUTS FROM SINGLE-ENDED AMPLIFIERS HAVING A COMMON LEAD WITH A SINGLE-ENDED INPUT

Filed June 10, 1968 2 Sheets-Sheet 2

INVENTOR.

ALFRED W BARBER

BY

Alfred W. Barber

ATTORNEY

United States Patent Office 3,528,024

Patented Sept. 8, 1970

3,528,024
COMPLEMENTARY TRACKING OUTPUTS FROM SINGLE-ENDED AMPLIFIERS HAVING A COMMON LEAD WITH A SINGLE-ENDED INPUT

Alfred W. Barber, Bayside, N.Y., assignor to Forbro Design Corp., New York, N.Y., a corporation of New York Filed June 10, 1968, Ser. No. 750,384
Int. Cl. H03f *3/68*
U.S. Cl. 330—117 6 Claims

ABSTRACT OF THE DISCLOSURE

Two single-ended operational amplifiers or operational power supplies can be connected to provide complementary tracking outputs about a neutral or common lead. The unique circuits provided in accordance with the present invention permit programming the two amplifiers or power supplies from a single-ended source of voltage or current having one end connected to the neutral or common lead of the output. Several forms of the present invention are provided.

CROSS-REFERENCES TO RELATED APPLICATIONS

There are no related applications.

BACKGROUND OF THE INVENTION

Field of the invention

The present invention relates to Amplifiers Class 330 and Cascaded Similar Amplifying Device of Different Characteristics, Subclass 150.

Description of the prior art

Operational amplifiers or operational power supplies may be defined as direct current amplifiers having substantial gain, predetermined phase characteristics and programmable by means of externally connected resistance or applied voltage or current. These devices are constructed with various combinations of single-ended and differential input and output circuits. The present invention is concerned with operational amplifiers and operational power supplies having single-ended outputs.

It has been shown how two single-ended operational amplifiers or power supplies can be connected to provide complementary tracking outputs. Reference is made to Pat. No. 3,275,927 and to pages 102–103 in Kepco Power Supply Handbook. The complementary tracking mode of operation provides two outputs which can be made to be equal or proportional to each other and which can be controlled or programmed by a single-ended source of voltage or current. These prior art circuits require that the input or source be connected on one side to one side of the dual output and cannot be connected to the common or center lead of the dual output. The present invention concerns methods of and means for connecting one side or the return of the input voltage or current source to the neutral, common or center lead of the dual output circuit.

SUMMARY

While it has been shown in accordance with the so called complementary tracking circuits how single-ended operational amplifiers or power supplies can be connected to provide dual, i.e., positive and negative outputs about a common or neutral lead. However, these circuits are limited to using input sources of current or voltage which are returned to either the positive or negative output leads and not to the common or neutral lead. It is often desirable to program or control a dual or complementary tracking output from two single-ended operational amplifiers or power supplies from a source of current or voltage or current with one end connected to or returned to thte center terminal, neutral or common lead of the output circuit.

The invention basically comprises interconnection of one amplifier connected as an inverting unity gain (or other gain if the two sides of the output are to be proportional but not equal) operational amplifier and a second amplifier connected as a unity gain noninverting amplifier. The circuit can be provided in several forms which are modifications of the invention. Several forms and modifications of the invention are provided and it will be clear as to the form and operation of these forms from the detailed description of the invention given in connection with the various figures of the drawing.

DESCRIPTION OF THE PREFERRED EMBODIMENTS

Figure 1:
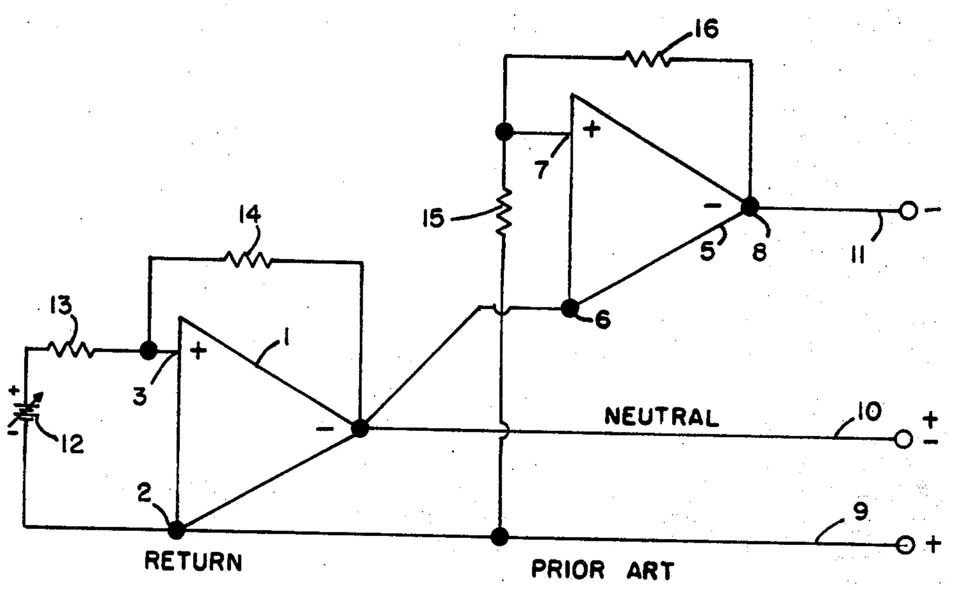
FIG. 1 is a simplified diagram of prior art complementary tracking circuit.

FIG. 1 shows a circuit of a typical complementary tracking circuit. A first single-ended operational amplifier/power supply 1 is provided including a common terminal 2, an inverting input terminal 3 and an output terminal 4. A second operational amplifier/power supply 5 is provided including a common terminal 6, an inverting input terminal 7 and an output terminal 8. The two amplifiers are interconnected with common terminal 6 connected to output terminal 4 and output leads 9, 10 and 11 are taken from common terminal 2, output terminal 4 and output terminal 8 respectively wherein lead 10 may be considered the neutral or common lead of the dual output. The input or source voltage as represented by variable battery 12 is connected on one side or returned to common terminal 2 of amplifier 1. The positive or high side of battery 12 is connected through input resistor 13 to inverting input terminal 3. A feedback resistor 14 is connected from output terminal 4 to inverting input terminal 3 so that the closed loop gain of amplifier 1 is equal to the resistance of resistor 14 divided by the resistance of resistor 13. Typically, amplifier 1 will be operated at unity gain, i.e., with resistors 13 and 14 equal. The second amplifier 5 is connected with common terminal 6 connected to output terminal 4 of amplifier 1. This second amplifier is also provided with input and feedback resistors 15 and 16 respectively which, when made equal, will also provide unity gain. The input voltage is derived from lead 9, which is positive with respect to output terminal 4. Since amplifier 5 is connected as an inverting amplifier, this positive input voltage will produce a negative output voltage at output terminal 8 and on line 11. Thus, there has been provided a dual output, a negative voltage on lead 11 with respect to neutral lead 10 and an equal positive voltage on lead 9.

It will be seen from FIG. 1 that this complementary tracking circuit provides equal or proportional positive and negative voltages around a neutral lead. However, the input or programming voltage must be returned to the positive lead 9 (the common point 2 of amplifier 1) and and not to the neutral lead (which may be considered the common lead to the two output voltages). The present invention is concerned with novel modes of connection particularly adapted to permit the use of a neutral or common lead which is not only the neutral or common lead for the output voltages but is also the return or common lead for the source of input or programming voltage.

Figure 2:
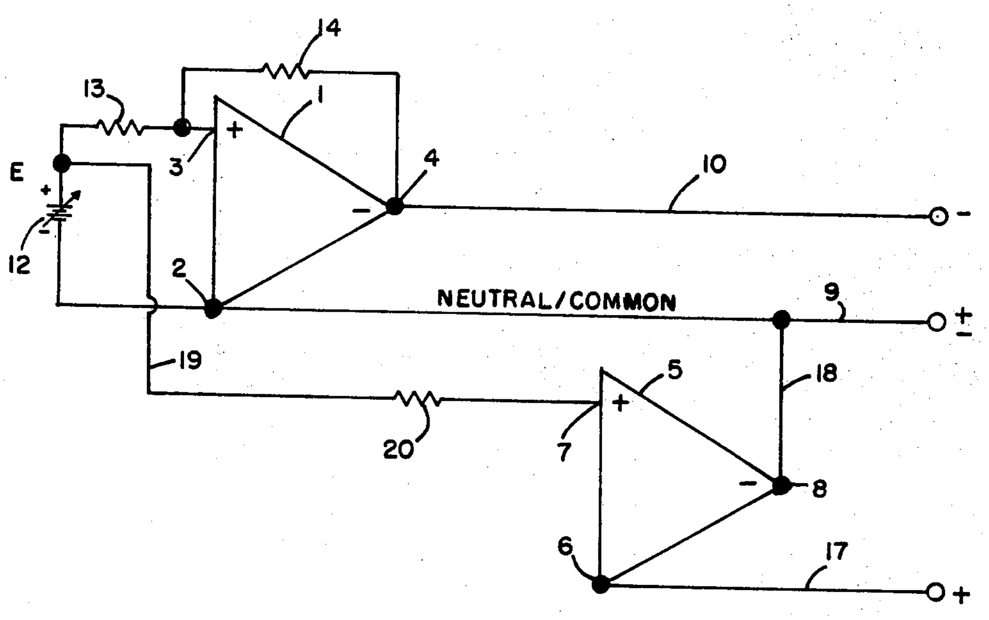
FIG. 2 is a simplified circuit diagram of the basic form of the present invention.

FIG. 2 shows how two operational amplifiers or operational power supplies can be connected to provide a neutral or common lead for both input and output circuits. Amplifier 1 receives input from voltage source 12 through input resistor 13 and provides an output of inverted polarity between output terminal 4 and common terminal 2 and over output leads 10 and 9 respectively. The ratio of output voltage to input voltage 12 will be equal to the ratio of the resistances of feedback resistor 14 to input resistor 13, typically unity. The output may be made greater or less than the input by suitable choice of resistors 13 and 14. In order to provide the second output having a polarity opposite to the output 4 and referred to the same neutral or common lead 9, amplifier 5 is connected as a unity gain voltage follower with output terminal 8 connected over lead 18 to common lead 9 and input terminal 7 connected through resistor 20 and over lead 19 to the high side of voltage source 12. The output is taken between output terminal 8 and common terminal 6 over lead 17. The output on lead 17 will be of the same polarity as source 12. Resistor 20 is provided and equal to input resistor 13 in order to balance the effects of amplifier input current in the input circuits of amplifiers 1 and 5. It will be seen that this circuit accomplishes the purpose of the invention, i.e., it provides dual output voltages of opposite polarity with respect to a neutral or common lead and that the input voltage (which may be a current source, as well) is returned or referred to this same neutral or common lead. As has been stated above, equal outputs will be provided if resistors 13 and 14 are equal. Unequal outputs will be provided if they are unequal.

Figure 3:
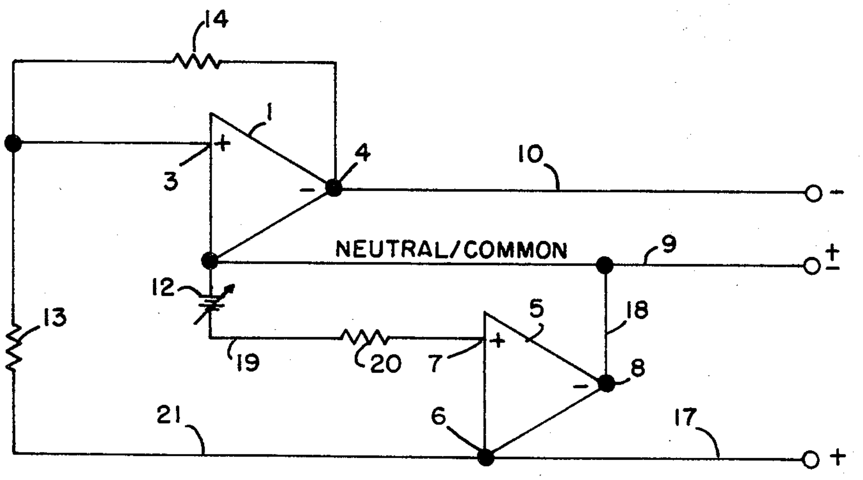
FIG. 3 is a simplified circuit diagram of a modified form of the present invention.

FIG. 3 is a modification of the invention shown in FIG. 2 and described above. This modification has the object of reducing the load on the source voltage 12. In FIG. 2 the load on voltage source 12 is substantially equal to the resistance of input resistor 13. For sources affected by loading, the circuit of FIG. 3 removes the load of resistor 13 from the source. Amplifier 5 is again connected as a unity gain voltage follower producing an output voltage between common terminal 6 and output terminal 8 equal to source voltage 12. In this mode, amplifier 5 operates with very high impedance at input terminal 7 and hence very little load is imposed on source 12. If an amplifier with input offset adjustments is used, this load on source 12 can be made to approach zero. Amplifier 1 is connected as an inverting amplifier with input taken from common terminal 6 through input resistor 13. Thus, this circuit also accomplishes the purpose of the invention, i.e., it provides two equal and opposite outputs from a single ended input with a neutral or common lead which is the same for both input and output circuits. The circuit of FIG. 3 has the added advantage of imposing practically no load on the voltage or current source. As in the case of FIG. 2, unequal outputs may be provided by proper choice of resistors 13 and 14.

Figure 4:
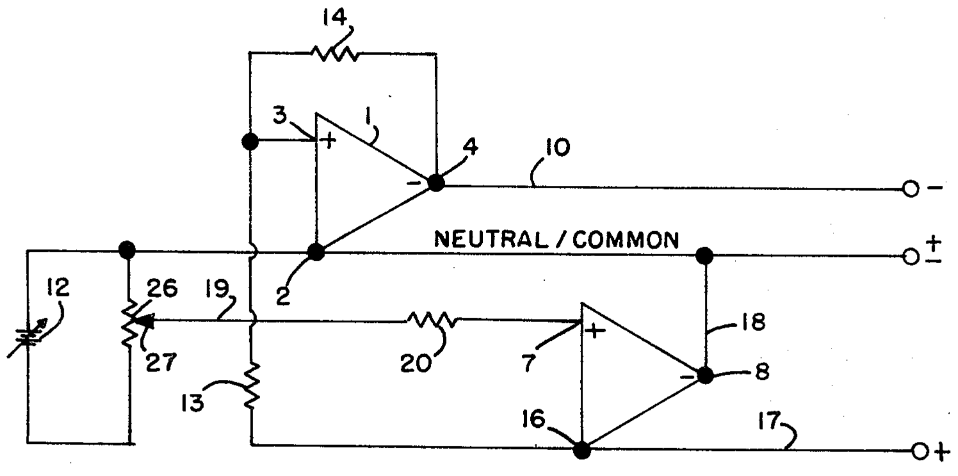
FIG. 4 is a simplified circuit diagram of another modified form of the present invention.

FIG. 4 is a still further modification of the present invention in which the basic form of FIG. 2 is used and a potentiometer 26 is connected across source 12 in order to provide means for reducing the output voltages below the input or source voltage 12. The portion of the source voltage applied to the amplifiers is determined by the setting of variable contact 27. While the load on source 12 will be equal to the resistance of potentiometer 26, this resistance can be made very high since with the input impedance to amplifier 5 very high, loading on the potentiometer is small.

The polarities shown in FIGS. 2, 3 and 4 may all be reversed without departing from the spirit and scope of the invention. This includes the source voltage, input and output voltages of the amplifiers and the output voltages on each side of the neutral/common line.

While only a few forms of the present invention have been shown and described, many modifications will be apparent to those skilled in the art and within the spirit and scope of the invention.

I claim:

1. A bipolar regulated power supply comprising two similar operational power supplies each including an inverting input terminal, an output terminal and a common terminal, said two power supplies to be programmed from a common source of voltage and to provide oppositely polled output voltages with respect to a common neutral;

the improvement which comprises means for connecting the output terminal of one of said power supplies to the common terminal of the other of said power supplies;

means for connecting said source of programming voltage between the last said connection and the inverting input of both of said power supplies whereby said programming voltage is connected to the neutral between said output voltages, said neutral being said connection to said output of one power supply and the common terminal of the other of said power supplies;

means for deriving one output voltage between said neutral and the output terminal of one of said power supplies;

and means for deriving the other output between said neutral and the common terminal of the other of said power supplies.

2. A bipolar regulated power supply as set forth in claim 1:

and including substantially equal resistors connected between the source of programming voltage and the inverting inputs of each of the two power supplies for equalizing the effect of input current in each of said power supplies.

3. A bipolar regulated power supply as set forth in claim 1:

wherein one of said power supplies is provided with input and feedback resistors to determine the output voltage thereof and the other is connected as a voltage follower without a feedback resistor.

4. A bipolar regulated power supply comprising two similar operational power supplies each including an inverting input terminal, an output terminal and a common terminal, said two power supplies to be programmed from a single source of input voltage and to provide oppositely polled output voltages with respect to a common neutral terminal;

the improvement which comprises means for connecting the common terminal of the first of said power supplies to said common neutral;

means for connecting the output terminal of the second of said supplies to said common neutral;

means for coupling one side of a source of input voltage to the inverting input of the said second supply;

means for coupling the common terminal of said second supply to the inverting input terminal of said first supply;

means for connecting the other side of said source of input voltage to said common neutral terminal;

means for deriving one output between said common neutral and the output terminal of said first supply; and means for deriving an oppositely polled output between said common neutral and the common terminal of said second supply.

5. A bipolar regulated power supply as set forth in claim 4:

wherein said coupling from the common terminal of said second supply and the inverting input terminal of said first supply and said feedback resistor are substantially equal resistors and said outputs are substantially equal.

6. A bipolar regulated power supply as set forth in claim 4:

and including means for varying the input voltage to said second supply.

References Cited

UNITED STATES PATENTS

| | | | |
|---|---|---|---|
| 2,618,711 | 11/1952 | Bourget | 330—117 X |
| 3,133,242 | 5/1964 | Harries | 307—296 X |
| 3,142,019 | 7/1964 | Favin | 330—14 |
| 3,363,191 | 1/1968 | Boughtwood et al. | 330—14 X |

OTHER REFERENCES

Handbook of Operational Amplifier Applications, Burr-Brown Research Corp., copyright 1963 page 50.

ROY LAKE, Primary Examiner

J. B. MULLINS, Assistant Examiner

U.S. Cl. X.R.

330—125